United States Patent [19]

Crosbie et al.

[11] Patent Number: 5,537,679
[45] Date of Patent: Jul. 16, 1996

[54] COMMUNICATION NETWORK WITH FLEXIBLE HANDOFF SCHEDULING FOR MOBILE NODES

[75] Inventors: Jeffrey S. Crosbie, Chandler, Ariz.; David M. Baum, McLean, Va.; Michael W. Krutz, Chandler, Ariz.

[73] Assignee: Motorola, Inc., Schaumburg, Ill.

[21] Appl. No.: 283,368

[22] Filed: Aug. 1, 1994

[51] Int. Cl.⁶ .................................................. H04B 7/185
[52] U.S. Cl. ........................... 455/132; 455/33.2; 379/60; 342/352
[58] Field of Search ............................... 455/12.1, 13.1, 455/13.2, 13.3, 13.4, 33.1, 69, 70, 53.1, 54.1, 54.2, 33.2; 342/357, 352, 418; 244/158 R; 379/59, 63, 60

[56] References Cited

U.S. PATENT DOCUMENTS

| | | |
|---|---|---|
| 3,340,531 | 9/1967 | Kefalas et al. .......................... 455/13.1 |
| 3,497,807 | 2/1970 | Newton .................................... 455/13.1 |
| 4,811,380 | 3/1989 | Spear . |
| 4,912,475 | 3/1990 | Counselman, III ...................... 342/352 |
| 4,916,691 | 4/1990 | Goodman . |
| 5,101,501 | 3/1992 | Gilhousen et al. . |
| 5,140,627 | 8/1992 | Dahlin . |
| 5,142,654 | 8/1992 | Sonberg et al. . |
| 5,159,593 | 10/1992 | D'Amico et al. . |
| 5,161,248 | 11/1992 | Bertiger et al. ......................... 455/12.1 |
| 5,179,559 | 1/1993 | Crisler et al. . |
| 5,227,802 | 7/1993 | Pullman et al. ......................... 342/352 |
| 5,367,304 | 11/1994 | Jan et al. .................................... 379/63 |
| 5,415,368 | 5/1995 | Herstein et al. ......................... 455/12.1 |

OTHER PUBLICATIONS

Mobile Satellite Communications Nov./1991, Author Steve Moritz, Handoff Design Consideration for the IRIDIUM™.

*Primary Examiner*—Andrew Faile
*Attorney, Agent, or Firm*—Harold C. McGurk, IV; Phillip E. Hall

[57] ABSTRACT

A communication network (10) includes a constellation (12) of mobile satellites (14) in low earth orbits and stationary gateways (24) near the surface of the earth. Data packets are routed through the network (10) using communication paths that change from moment to moment due to satellite movement. The routing paths are scheduled in advance (58) in response to predictable orbital satellite movement. The constellation (12) is configured so that only a minor amount of overlap in radio range exists between adjacent satellites (14). Gateways (24) include multiple, spaced apart antennas (30) that may be used to acquire arriving satellites (14'). When a gateway (24) has trouble quickly acquiring an arriving satellite (14'), an exception handoff time may be substituted for the scheduled normal handoff time at the gateway (24), departing satellite (14), and arriving satellite (14') involved.

14 Claims, 7 Drawing Sheets

| SATELLITE GROUND LINK DIRECTIVE | | |
|---|---|---|
| ANTENNA | DIRECTION | SIGNAL TYPE |

112

5,537,679

COMMUNICATION NETWORK WITH FLEXIBLE HANDOFF SCHEDULING FOR MOBILE NODES

TECHNICAL FIELD OF THE INVENTION

The present invention relates generally to networks in which communications are routed along a variety of paths among many different network nodes. More specifically, the present invention relates to such networks in which paths are selected for delivering communications through moving nodes.

BACKGROUND OF THE INVENTION

The problems associated with choosing communication paths through a network that includes moving nodes and delivering communications through such paths are severely felt in networks that include satellite switching nodes. Satellite communication networks benefit from placing satellites in low earth orbits. In low earth orbits, the area of radio coverage for any single satellite is smaller than with higher orbits. The low earth orbits limit interference between communications taking place in various areas of coverage and allow a spectrally efficient cellular communication system that uses smaller cells.

However, satellites in low earth orbits move relative to the surface of the earth. Typically, communications take place between two or more points near the surface of the earth. A communication path that includes particular satellite nodes may be advantageous one moment and disadvantageous the next due to satellite movement. Accordingly, as one satellite disappears from the radio view of a point near the surface of the earth, a handoff operation should switch a communication link between the point and the satellite to some other node of the network so that communications may continue.

In a satellite communication network, this other node may be another satellite. In fact, the network may arrange an entire constellation of satellites in low earth orbits so that as one satellite departs the radio view of a point near the surface of the earth, another satellite arrives. Desirably, some overlap occurs so that communications may continue with the departing satellite until a communication link is established with the arriving satellite. On the other hand, this overlap is no larger than necessary to perform a handoff because the tremendous expense associated with placing and maintaining satellites in orbit demands a constellation of no more satellites than is minimally required.

Orbiting satellites move in predictable orbits. Positions of various satellites relative to a point near the surface of the earth may be calculated well in advance of the time when the satellites will occupy those positions. On the other hand, precisely predicting the duration required for a land station to acquire an arriving satellite's signal is a difficult task. Environmental factors, such as the potential presence of rain in the vicinity, can affect acquisition time, along with random occurrences related to scanning for and synchronizing with the arriving satellite's signal.

A satellite communication network could simply budget for failed handoffs when significant rain is in the vicinity. However, the tremendous expense associated with a satellite communication network makes such rain-based unreliability intolerable. Alternatively, a satellite communication network could design the satellite constellation so that a failure to acquire a satellite in a worst case rain situation is extremely unlikely. However, this requires greater overlap time between satellites, wastes scarce resources for the vast majority of situations, and increases costs significantly.

SUMMARY OF THE INVENTION

Accordingly, it is an advantage of the present invention that an improved communication network is provided.

Another advantage of the present invention is that a satellite communication network schedules times for handing off communication links between satellites.

Another advantage of the present invention is that localized exceptions to the scheduled handoff times are permitted.

Another advantage is that the present invention incorporates features to improve the likelihood of a ground station acquiring an arriving satellite signal before handing off communications to a link between the ground station and arriving satellite.

The above and other advantages of the present invention are carried out in one form by a communication network with flexible handoff scheduling. The network includes a departing mobile node and an arriving mobile node. The departing and arriving nodes are in communication with one another through one or more constellation communication links. A stationary node supports a switchable communication link with one of the mobile nodes. A point in time at which to handoff the switchable link from the departing mobile node to the arriving mobile node is established. Prior to this point in time, a determination is made concerning whether the stationary node can communicate with the arriving mobile node.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
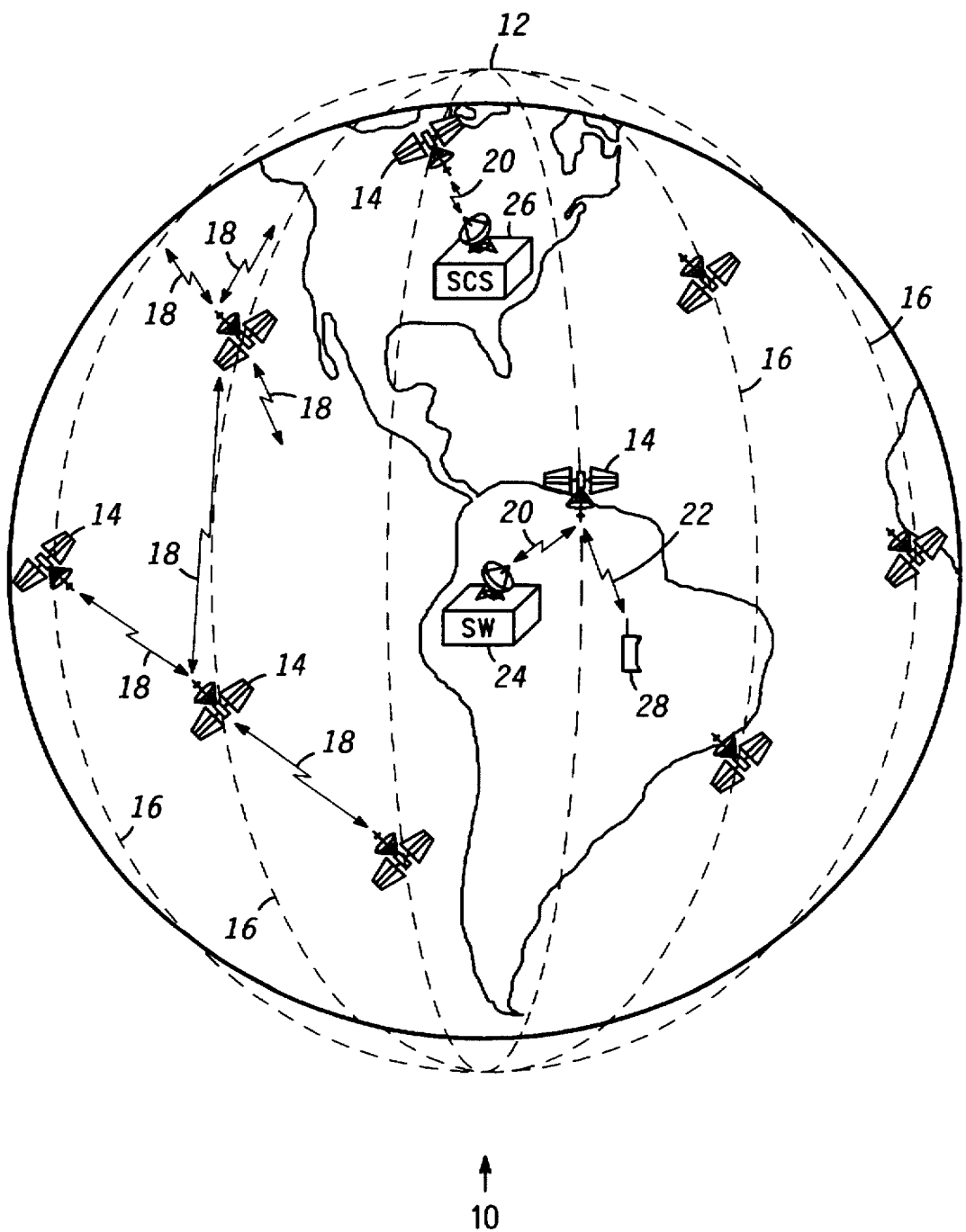
FIG. 1 shows a layout diagram of an environment within which a communication network configured in accordance with the present invention is practiced.

FIG. 1 illustrates a satellite-based communication network 10. Network 10 includes a constellation 12 of switching nodes 14 that are dispersed around the earth. In the preferred embodiment, nodes 14 are orbiting satellites. Satellites 14 preferably occupy polar, low-earth orbits 16. The presently preferred embodiment of network 10 uses six polar orbital planes, with each orbital plane holding eleven of satellites 14. For clarity, FIG. 1 illustrates only a few of these satellites 14.

Orbits 16 and satellites 14 are distributed around the earth. Each orbit 16 encircles the earth at an altitude in the 700–800 km range. Due to these low-earth orbits 16, satellites 14 travel with respect to the earth at around 25,000 km/hr and complete an orbit in around 100 minutes. The positions of satellites 14 relative to one another remain relatively stationary within constellation 12, except for orbits 16 converging and crossing over each other in the polar regions.

A line-of-sight exists between each satellite 14 and leading and following satellites 14 in the same orbital plane 16 and between leading and following satellites 14 in adjacent planes. RF communication links 18 are established between various ones of these adjacent satellites 14. Links 18 are referred to as constellation links herein to distinguish them from switchable ground links 20 and 22 used to inject and withdraw signals into and from constellation 12.

In the preferred embodiment, four bi-directional RF communication constellation links 18 are supported for each satellite 14. Fore and aft constellation links 18 exist between a satellite 14 and the preceding and following satellites 14 orbiting in the same plane. In addition, fore-left and aft-right constellation links 18 exist between each satellite 14 and the preceding and following satellites 14, respectively, orbiting in left and right adjacent planes. In the embodiment of the present invention depicted in FIG. 1, communications may be delivered directly from a source satellite 14 to some of the other potential target satellites in constellation 12 through constellation links 18. However, if no direct constellation link 18 exists between a source satellite 14 and a destination satellite 14 for a particular communication, constellation links 18 to one or more bridging satellites 14 may be used to route the communication. Each satellite 14 supports a similar set of constellation links 18 and neighbor nodes.

While FIG. 1 and the above-presented discussion describe a preferred orbital geometry for network 10, those skilled in the art will appreciate that the switching node which each satellite 14 provides need not be positioned as described herein. For example, such nodes may be located near the surface of the earth or in orbits other than those described herein. Likewise, the precise number of switching nodes may vary from network to network, the number of constellation links 18 supported by each node may vary from network to network, and the population of switching nodes with which each node may directly communicate need not be limited to nodes physically nearby.

With continued reference to FIG. 1, satellites 14 communicate with devices near the earth's surface through many stationary gateways (GW) 24, of which FIG. 1 shows only one, a few space control segments (SCS) 26, of which FIG. 1 shows only one, and any number, potentially in the millions, of mobile radiocommunication subscriber units 28, of which one is shown in FIG. 1. Subscriber units 28 communicate through ground links 22. Gateways 24 and space control segment 26 communicate through switchable ground links 20. The preferred embodiment employs RF communications, preferably in the L band, to establish communication link 22. In addition, RF communications, preferably in the K bands, may be used to establish communication links 18 and 20. Those skilled in the art will appreciate that communication links which rely upon higher frequencies, such as K band, may be susceptible to significant signal attenuation if the links are directed through rain.

Subscriber units 28 may be located anywhere on or near the surface of the earth. Gateways 24 are preferably distributed over the surface of the earth in accordance with geo-political boundaries. In the preferred embodiment, each satellite 14 may communicate with up to four gateways 24 at any given instant. Space control segment 26 preferably resides in the northern or southern latitudes, where the convergence of orbits 16 causes a greater number of satellites 14 to come within direct line-of-sight view of a single point on the surface of the earth with respect to more equatorial latitudes. Preferably, around two to four space control segments 26 are used so that all satellites 14 in the constellation may at some point in their orbits 16 come within direct view of their assigned space control segment 26.

Nothing prevents gateways 24 and space control segments 26 from being located together on the ground. However, gateways 24 serve a different function from that of space control segments 26. Space control segments 26 preferably perform telemetry, tracking, and control (TT&C) functions for the constellation 12 of satellites 14. Preferably, gateways 24 operate as communication nodes in network 10. Diverse terrestrial-based communications systems, such as national public switched telecommunications networks (not shown), may access network 10 through gateways 24. Due to the configuration of constellation 12, at least one of satellites 14 is within view of each point on the surface of the earth at all times.

Accordingly, network 10 may establish a bi-directional communication circuit or two unidirectional circuits through constellation 12 of satellites 14 between any two subscriber units 28, between any subscriber unit 28 and any gateway 24, or between any two gateways 24. However, these communication circuits use different nodes of constellation 12 from moment to moment for delivering communications. The nodes change in response to the movement of constellation 12 with respect to the earth.

In general, space control segment 26 forms numerous routing plans for each satellite 14 in network 10 and distributes the routing plans to the satellites 14. Each routing plan tells its satellite 14 where to route its incoming data packets so that they can be efficiently delivered to their intended destinations. Each routing plan remains valid for only a short duration. In the course of this short duration, satellites 14 move a sufficient distance so that an old routing plan no longer specifies efficient paths to follow in routing communications through network 10. Desirably, each satellite 14 in constellation 12 switches between an old routing plan and a new routing plan substantially simultaneously. This simultaneous switching prevents data packets from reversing course, or ping-ponging, between satellites 14 that may be operating upon different versions of routing plans. Such course reversals could unnecessarily consume network resources and cause traffic bottlenecks leading to lost data packets.

Figure 2:
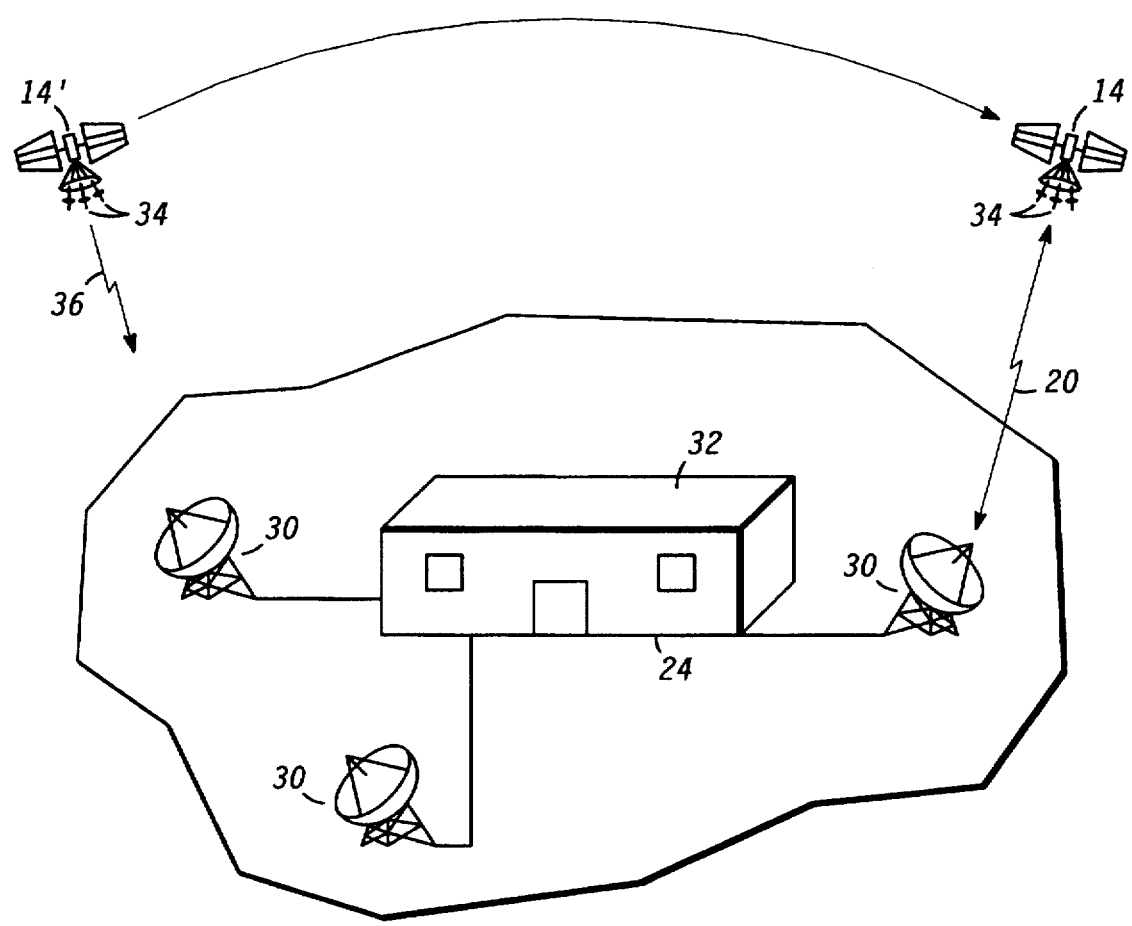
FIG. 2 shows an area where a stationary gateway node of the network is located.

FIG. 2 shows an area where one of gateway nodes 24 of network 10 (see FIG. 1) is located. Gateway 24 is a stationary node that includes any number, but preferably at least three, adjustable antennas 30. Antennas 30 each couple to a facility 32 through a suitable communication link. Facility 32 houses electronic control and switching components. Antennas 30 are preferably spaced at least 30 meters, more preferably at least ten km, and not more than fifety Km apart from one another.

Figure 3:
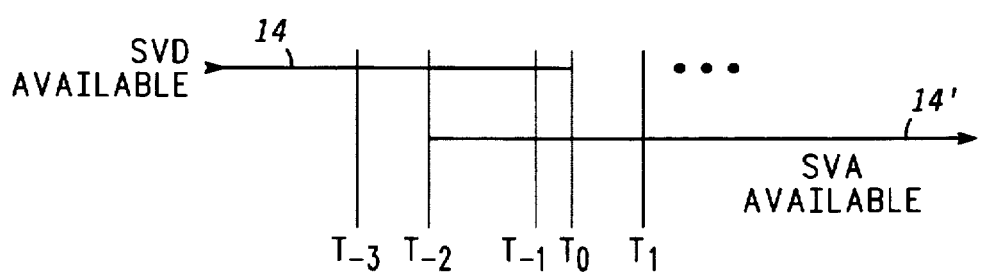
FIG. 3 shows a timing diagram which depicts the operation of a departing satellite node, an arriving satellite node, and the gateway node.

FIG. 3 shows a timing diagram which depicts the cooperative operation of a departing one of satellites 14, referred to as departing satellite (SVD for space vehicle, departing) 14, an arriving one of satellites 14, referred to as arriving satellite (SVA) 14', and gateway node 24. With reference to FIGS. 2 and 3, while departing satellite 14 is in radio view of a first one of antennas 30, switchable ground link 20 is maintained between gateway 24 and departing satellite 14 through that first one of antennas 30. The top trace in FIG. 3 depicts the duration of availability over which departing satellite 14 may communicate with gateway 24. However, as satellite 14 nears the horizon for the first one of antennas 30, communication quality may deteriorate. The potential for deterioration depends upon weather and other factors because of the large amount of atmosphere and larger distances over which the RF signals must propagate. FIG. 3 depicts the duration of this potentially reduced communication quality as three dots in the top trace of FIG. 3 which begin at T0. Eventually, departing satellite 14 drops below the horizon, and communication with gateway 24 is no longer possible.

Constellation 12 (see FIG. 1) is configured so that arriving satellite 14' comes into radio view as departing satellite 14 leaves. The arriving satellite 14' may be in the same orbital plane 16 (see FIG. 1) as departing satellite 14 or in an adjacent orbital plane 16. For a brief duration, both departing and arriving satellites 14 and 14' are within view of gateway 24.

All satellites 14, including arriving satellite 14', have several antennas 34 to support communication links 18 (see FIG. 1) and 20. Desirably, at least one antenna 34 is not used to support a communication link 18 or 20 as arriving satellite 14' begins to rise above the horizon for gateway 24. Thus, before arriving satellite 14' begins to rise above the horizon for gateway 24, at a time referred to as T−3 in FIG. 3, arriving satellite 14' aims its unused antenna 34 in the direction of gateway 24 and activates a beacon signal 36 transmitted through this antenna 34.

As soon as arriving satellite 14' comes into radio view of gateway 24, one or more of second and third ones of antennas 30 scan for beacon signal 36. FIG. 3 refers to the point in time when arriving satellite 14' first appears above the horizon and gateway 24 can start scanning for beacon signal 36 as T−2. Gateway 24 starts its scan by aiming its second and/or third ones of antennas 30 at the point in the sky where arriving satellite 14' should be.

In normal circumstances, gateway 24 should acquire and establish communications with arriving satellite 14' before time T0, when diminished communication over ground link 20 becomes more likely. Moreover, gateway 24 should be able to acquire arriving satellite 14' using only one of the second and third antennas 30. Thus, at time T0 switchable ground link 20 normally gets shifted from departing satellite 14 to arriving satellite 14'. Time T0 represents a normal handoff time for gateway 24. Starting at time T0 the routing plan for the entire network 10 (see FIG. 1) changes to accommodate the switched ground link 20. From this instant, all nodes in network 10 begin to route data packets which are targeted for delivery to gateway 24 toward arriving satellite 14' rather than toward departing satellite 14. While T0 represents a normal handoff time for gateway 24, in the event when rain cells did not allow communication with departing satellite 14, T0 may be shifted in time to allow an earlier handoff time to the arriving satellite 14'.

However, in unusual circumstances, such as when rain cells are in the vicinity of gateway 24, gateway 24 may have trouble acquiring arriving satellite 14'. To improve the likelihood of acquisition within the allotted duration, gateway 24 desirably operates in an enhanced mode where both of the second and third antennas 30 are operated to scan for arriving satellite 14'. Each two of antennas 30 are spaced a significant distance apart. This spacial diversity significantly improves the odds of a propagation path for RF communications avoiding severe attenuation due to a heavy rain cell. Moreover, random errors related to aiming antennas 30 are reduced when more than one antenna is operated.

While the enhanced mode of operation may be in effect at all times, it is preferable to limit use of the enhanced mode to times when rain cells are in the area and acquisition problems are more likely. The potential benefits in other circumstances do not justify the wear and tear on antenna mechanisms. In addition, the additional antenna 30 available for acquisitions serves as a back-up should one of the other antennas 30 fail.

Whether or not gateway 24 is operating in the enhanced acquisition mode, it makes a decision at a time T−1 concerning whether it has acquired arriving satellite 14'. If acquisition has been achieved, the network-wide routing plan goes into effect at T0 as scheduled. If acquisition has not been achieved, a localized exception to the routing plan may be implemented among gateway 24, departing satellite 14, arriving satellite 14', and any bridging satellites 14 (see FIG. 1) that may be needed to route communications between departing and arriving satellites 14 and 14'. Generally speaking, a single bridging satellite 14 may be required in approximately one-half of such situations where arriving satellite 14' is not in the same orbital plane 16 (see FIG. 1) as departing satellite 14.

When operating under this exception, gateway 24, departing satellite 14, arriving satellite 14', and any bridging satellites 14 operate under the old routing plan while the remainder of network 10 operates under the new routing plan. In other words, while operating under the exception, switchable ground link 20 remains established between gateway 24 and departing satellite 14 after normal handoff time T0. Data packets which are received at arriving satellite 14' destined for gateway 24 are routed to departing satellite 14. The exception remains in effect until time T+1, which occurs just as departing satellite 14 entirely leaves the radio view of gateway 24. After time T+1, the entire network 10 synchronizes to the new routing plan whether or not gateway 24 has acquired arriving satellite 14'. Time T+1 represents an exception handoff time for gateway 24. If gateway 24 acquires arriving satellite 14' between T−1 and exception handoff time T+1, switchable communication link 20 switches to arriving satellite 14' at time T+1. If gateway 24 continues to fail to acquire arriving satellite 14', which is an extremely unlikely situation, switchable link 20 is lost.

Figure 4:
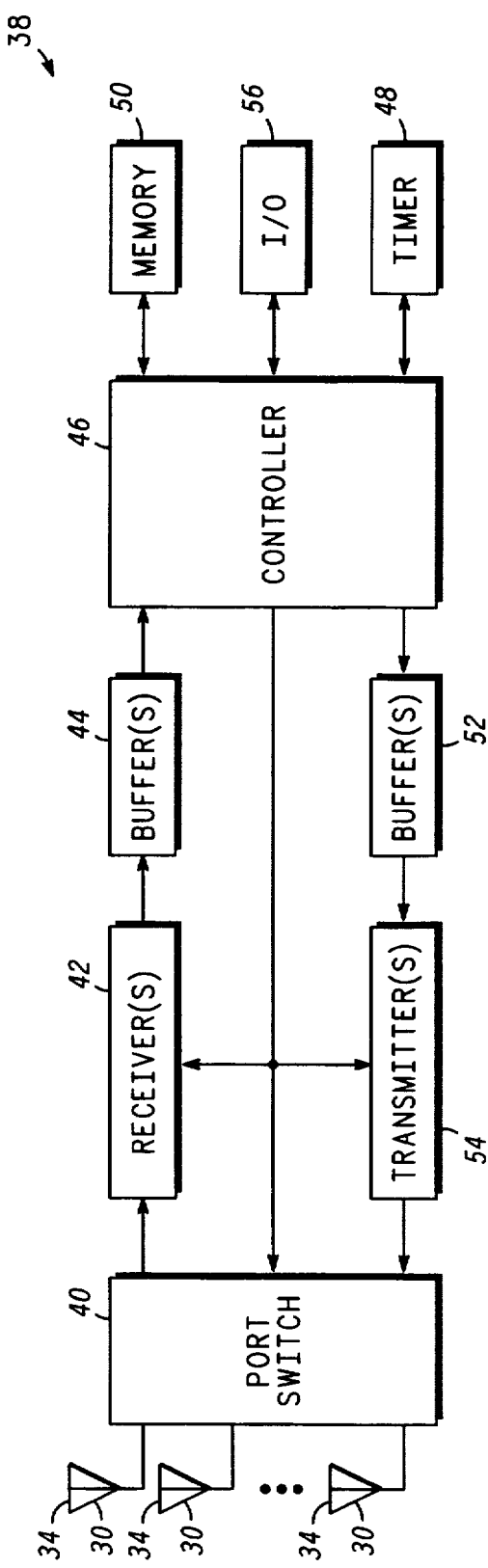
FIG. 4 shows a block diagram which describes the configuration of various nodes of the network.

FIG. 4 shows a block diagram which describes the hardware configuration of a generic node 38 in network 10. Node 38 represents any satellite 14, gateway 24, or space control segment 26 (see FIG. 1). Node 38 includes any number of antennas 30 or 34 which receive signals from communication links 18 and/or 20. Antennas 30 or 34 couple through a port switch 40 to one or more receivers 42. Port switch 40 forms desired circuits between antennas 30 or 34 and receivers 42. Receivers 42 couple to receive buffers 44, which temporarily store data received at receivers 42 until these data can be processed.

A processor or controller 46 couples to receive buffers 44, receivers 42, and port switch 40. Controller 46 couples to port switch 40 to control which antennas 30 or 34 are connected to which receivers 42. Controller 46 couples to receivers 42 to control receive parameters, such as frequency, timing, and the like, and controller 46 obtains received data packets from receive buffers 44.

Controller 46 additionally couples to a timer 48, a memory 50, transmit buffers 52, and transmitters 54. Controller 46 uses timer 48 to help monitor real time and to maintain the current date and time. Memory 50 includes data which serve as instructions to processor or controller 46 and which, when executed by processor or controller 46, cause node 38 to carry out processes which are discussed below. In addition, memory 50 includes variables, tables, and databases that are manipulated due to the operation of node 38.

Transmit buffers 52 temporarily store data placed therein by controller 46. Controller 46 couples to transmitters 54 to control transmit parameters, such as frequency, timing, and the like. Transmit buffers 52 also couple to transmitters 54. Transmitters 54 transmit signals modulated to carry the data stored in transmit buffers 52. These signals are transmitted through port switch 40 to antennas 30 or 34.

In earth-based nodes 38, such as gateways 24 and space control segments 26 (see FIG. 1), controller 46 also couples to an I/O section 56. I/O section 56 may include keyboards, displays, magnetic memory devices, printers, and other devices conventionally coupled to computerized equipment. In a gateway 24, I/O section 56 may additionally include components for coupling to a public switched telecommunications network.

In short, each node 38 of network 10 may represent a programmable machine which takes on the character assigned to it by software programming located in its memory 50 and executed by its processor or controller 46. FIGS. 5–13 illustrate procedures and memory structures carried out by various nodes 38 of network 10. In the preferred embodiments of the present invention, all satellites 14, gateways 24, and space control segments 26 perform substantially the same procedures as other satellites 14, gateways 24, and space control segments 26, respectively. Thus, while the description presented below is directed toward a single satellite 14, gateway 24, and space control segment 26, it generally applies to all respective nodes 38. Those skilled in the art will appreciate that programming instructions stored in memory 50 of the node 38 that serves as a satellite 14, gateway 24, or space control segment 26 control the processes discussed below in connection with FIGS. 5–13.

Figure 5:
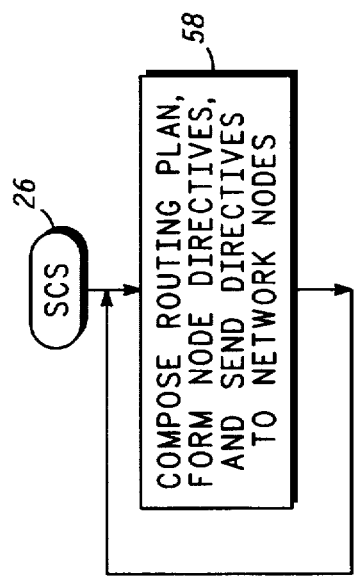
FIG. 5 shows a flow chart of a task performed by a space control segment of the network.

FIG. 5 shows a flow chart for a task 58 performed by space control segment (SCS) 26 of network 10 to support the handing off of switchable ground communication links 20 (see FIGS. 1–2). As indicated by ellipsis in FIG. 5, space control segment 26 may perform many other tasks that are not related to the present invention. However, in task 58 space control segment 26 composes a routing plan. As discussed above, the routing plan specifies how data packets are to be routed through network 10, and the routing plan remains valid for only a short duration.

The routing plan assumes that all packets carry a routing code that identifies a point near the surface of the earth to which the packet is to be delivered. This code may identify a node 38 that resides near the earth's surface or it may specify relatively stationary space coordinates or zones. The routing plan specifies an efficient path through nodes 38 in network 10 so that the packet may arrive at its destination. Such a plan may be devised, for example, by a computer program that determines an optimum path for a packet being routed between two nodes of network 10, then repeats the determination for all combinations of two nodes and for various steps in time. The location of all satellites 14 and gateways 24 are known at each instant because gateways 24 are stationary, and satellites 14 move in accordance with a predictable and well know orbital geometry.

The routing plan includes at least two features. One feature is a scheduled time at which the plan becomes effective. Task 58 may be performed "off-line" well in advance of this time. The time when the routing plan becomes effective may be a normal handoff time T0 (see FIG. 3) for a gateway 24.

Another feature is a set of directives for each satellite 14 that specifies how to route data packets arriving at that node. These data packets are routed in response to the above-discussed routing codes and the directives. As discussed above, each satellite 14 may include several ports through which received data packets may be transmitted. The directives, or routing tables, are unique to each satellite 14 in network 10 and inform each satellite 14 which of its ports to use in transmitting received data in accordance with routing codes.

Accordingly, task 58 forms the appropriate routing table directives and sends a schedule of corresponding directives to the various nodes 38 in network 10. The routing plan is shared among all nodes 38. Of course, nothing prevents task 58 from additionally identifying only portions of a new routing plan that differ from an old routing plan, and sending those portions to the appropriate nodes. The new routing plan includes scheduling data that instruct the nodes 38 when to activate the new routing data, and all nodes 38 are instructed to activate a new routing plan substantially simultaneously. Task 58 is an ongoing process that continuously repeats to track the movement of satellites 14. Consequently, new routing plans are continuously being generated and scheduled for activation after short durations following the previous routing plans.

Figure 6:
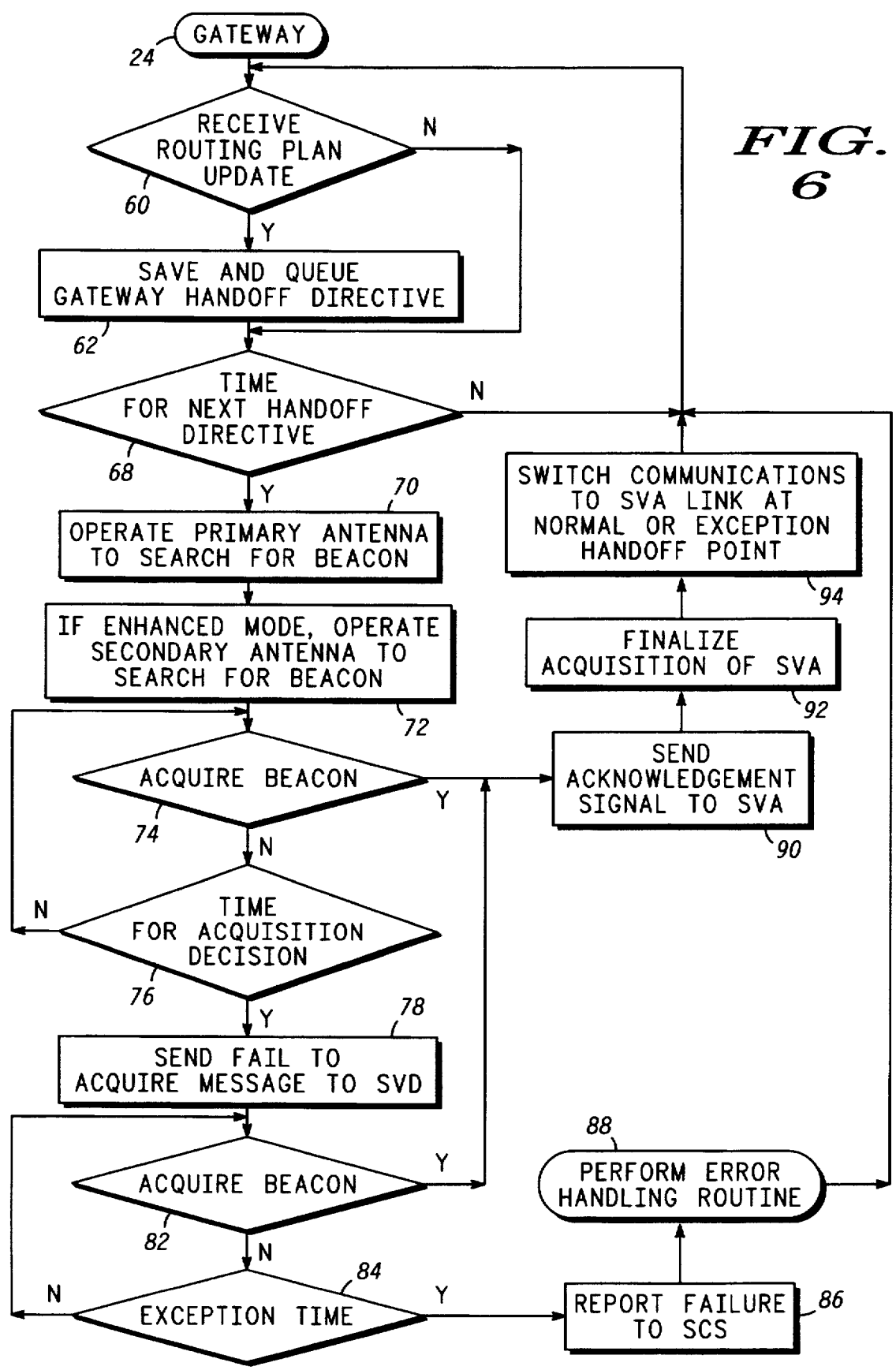
FIG. 6 shows a flow chart of tasks performed at the gateway node of the network.

FIG. 6 shows a flow chart of tasks performed at a gateway node 24 of network 10 to support the handing off of switchable ground communication links 20 (see FIGS. 1–2). As indicated by ellipsis, gateway 24 may perform many tasks that are not related to the present invention. However, in a query task 60 gateway 24 determines whether a new routing plan or an update to an old routing plan has been received from space control segment 26 (see FIGS. 1 and 5). The routing plan may be received in the form of a message transmitted from space control segment 26 to gateway 24 via network 10. If a routing plan update is received, a task 62 saves the routing plan update data in memory 50 (see FIG. 4) and queues an appropriate handoff directive for execution by gateway 24 at the indicated time.

Figure 7:
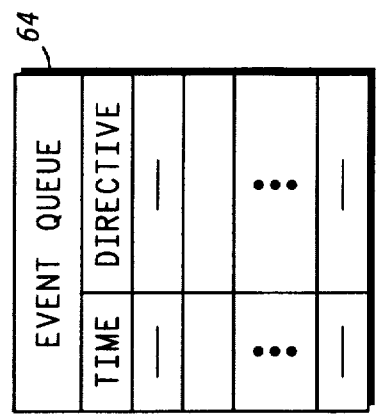
FIG. 7 shows a block diagram of an exemplary event queue memory structure maintained in various nodes of the network.
Figures 8, 9, 10:
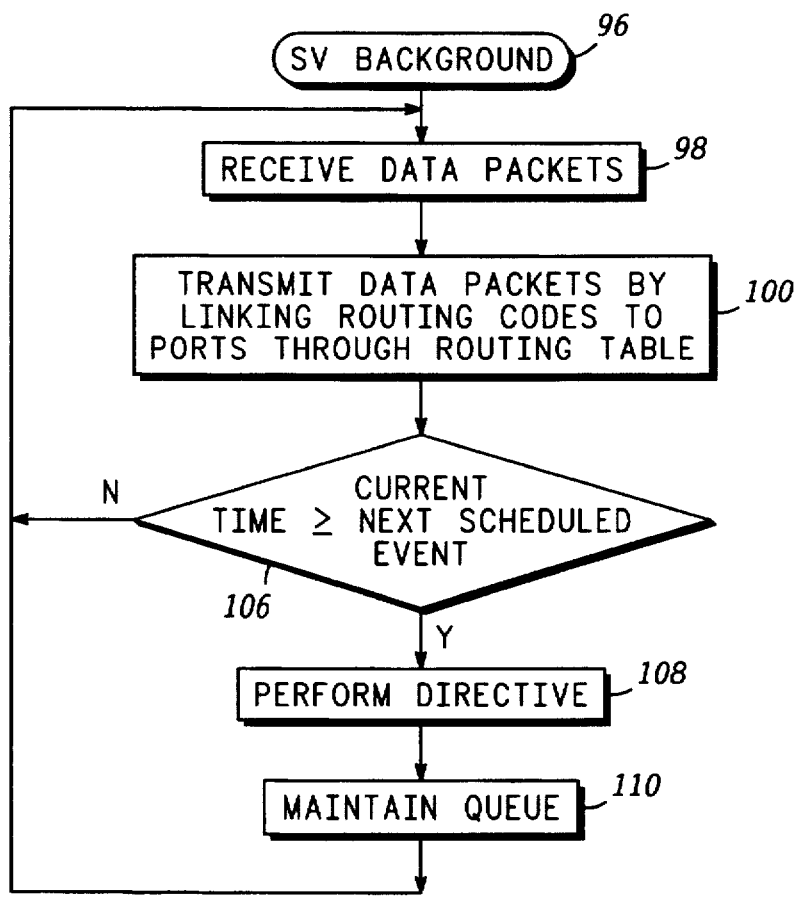
FIG. 8 shows a block diagram of a gateway handoff directive stored in a memory of a gateway node of the network.
FIG. 9 shows a data format diagram of a fail to acquire message formed by the gateway node.
FIG. 10 shows a flow chart of tasks performed in a background mode of operation for satellite nodes of the network.

FIG. 7 shows a block diagram of an exemplary event queue memory structure 64 maintained in the memories 50 (see FIG. 4) of various nodes 38 of network 10, including gateway 24. FIG. 8 shows a block diagram of an exemplary gateway handoff directive 66 received from space control segment 26 and stored in memory 50 of a gateway 24. FIGS. 7–8 together show how a routing plan update for a gateway 24 may be implemented. Referring to FIGS. 7–8, event queue 64 includes a list of times, where each time is associated with a corresponding directive or list of directives. When a listed time occurs, the node 38 performs the corresponding directives. When task 62 (see FIG. 6), queues a handoff directive, it schedules the time for performing the handoff directive in event queue +64 and links this time to a handoff directive 66. The time scheduled in event queue 64 desirably corresponds to T−2 (see FIG. 3), which is the point in time when gateway 24 starts scanning for the arriving satellite's beacon signal. This time is specified in the routing plan update data received from space control segment 26.

Gateway handoff directive 66 includes data than specify the identity of arriving satellite 14' (see FIGS. 2–3), the direction in the sky from gateway 24 where arriving satellite 14' should first appear, the normal handoff (HO) time, an exception handoff (HO) time to use if problems are encountered in acquiring arriving satellite 14' by the normal handoff time, and other related data that may be beneficial to the efficient operation of network 10. These items of data are desirably provided to gateway 24 from space control segment 26 in the routing plan update message. Of course, this data may be configured in many alternative forms. For example, the normal and exception handoff times may be configured as offsets from the time at which the gateway handoff directive 66 is scheduled.

Referring back to FIG. 6, after task 62 saves and queues any newly received routing plan data or when task 60 determines that no new routing plan data has been received, a query task 68 determines whether the next queued handoff directive 66 (see FIG. 8) should be executed. Task 68 may evaluate event queue 64 (see FIG. 7) and the current time maintained with the help of timer 48 (see FIG. 4) in making its determination. If the current time is not yet a queued event time, program control returns to task 60.

If task 68 determines that a gateway handoff directive 66 now needs to be executed, a task 70 operates a primary antenna 30 (see FIG. 2) to search for beacon signal 36 (see FIG. 2) being transmitted from arriving satellite 14' (see FIG. 2). A predetermined search pattern may be employed. The primary antenna 30 is any single antenna 30 which is not in use supporting a switchable ground communication link 20. The designation of a primary antenna 30 may change from time to time.

After task 70, a task 72 determines whether gateway 24 is operating in its enhanced mode, discussed above in connection with FIG. 2. If operating in the enhanced mode, task 72 operates a secondary antenna 30 in addition to the primary antenna 30 operated through task 70. Task 72 causes the secondary antenna 30 to search for beacon signal 36. The secondary antenna 30 is any single antenna 30 which is not in use supporting a switchable ground communication link 20 or scanning for beacon signal 36.

After task 72, a query task 74 determines whether gateway 24 has acquired beacon signal 36. If beacon signal 36 has been acquired, program control proceeds to a task 90, discussed below. If task 74 determines that beacon signal 36 has not yet been acquired through either the primary or, if used, secondary antennas 30, communications cannot yet commence with arriving satellite 14'. In this situation, a query task 76 determines whether the current time is the time for an acquisition decision. In other words, task 76 determines whether it is time T−1 (see FIG. 3) yet.

Acquisition decision time T−1 may be determined by consulting handoff directive 66 (see FIG. 8). Directive 66 may, but need not, specifically identify acquisition decision time T−1. If directive 66 does not specifically identify acquisition decision time T−1, it may be calculated as a predetermined offset prior to the normal handoff time T0. The duration of this offset should be no more than is necessary for gateway 24 to inform departing satellite 14, and for departing satellite 14 to inform arriving satellite 14', of the need for an exception to the implementation of the upcoming routing plan.

If task 76 determines that it is not yet acquisition decision time T−1, program control loops back to task 74. Program control remains in a loop that includes tasks 74 and 76 until either beacon signal 36 is acquired or acquisition decision time T−1 occurs. If acquisition decision time T−1 occurs before beacon signal acquisition, the normal handoff scheduled in the routing plan will be ignored, and gateway 24, departing satellite 14, and arriving satellite 14' will operate in the above-discussed exception. In this event, a task 78 sends a "fail to acquire" message 80, a data format diagram of which is presented in FIG. 9, to departing satellite (SVD) 14. Message 80 is sent over switchable ground link 20. As shown in FIG. 9, fail to acquire message 80 may include data that specify the identity of arriving satellite 14' and the exception handoff (HO) time T+1. This data may be obtained from gateway handoff directive 66 (see FIG. 8).

With reference back to FIG. 6, after task 78 a query task 82 determines whether gateway 24 has acquired beacon signal 36. If beacon signal 36 has been acquired, program control proceeds to task 90, discussed below. If task 82 determines that beacon signal 36 has not yet been acquired through either the primary or, if used, secondary antennas 30, communications still cannot commence with arriving satellite 14'. In this situation, a query task 84 determines whether the current time is the time for the exception handoff T+1. If task 84 determines that it is not yet exception handoff time T+1, program control loops back to task 82. Program control remains in a loop that includes tasks 82 and 84 until either beacon signal 36 is acquired or exception handoff time T+1 occurs.

If exception handoff time T+1 occurs before beacon signal acquisition, ground link 20 will be lost, and a task 86 forms a message that will report the failure of link 20 to space control segment (SCS) 26 at some time in the future. After task 86, an error handling routine 88 is performed to respond to the loss of link 20. Routine 88 may, for example, continue to scan for beacon signal 36 from arriving satellite 14'. After routine 88, program control loops back to task 60, discussed above.

When gateway 24 acquires beacon signal 36 in either of tasks 74 or 82, through either of the primary or secondary antennas 30 (see FIG. 2), a task 90 sends an acknowledgement signal to arriving satellite (SVA) 14'. Arriving satellite 14' responds by transmitting a preamble or other acquisition data. After task 90, a task 92 causes gateway 24 to more precisely synchronize with arriving satellite 14' and finalize the acquisition.

Next, a task 94 waits until either the normal handoff time T0 or the exception handoff time T+1 and then switches ground communication link 20 away from departing satellite 14 to arriving satellite 14'. When beacon signal 36 was acquired while operating in the loop that includes tasks 74 and 76, task 94 switches communications at normal handoff point T0. When beacon signal 36 was acquired while operating in the loop that includes tasks 82 and 84, normal handoff point T0 is disregarded and task 94 switches communications at exception handoff point T+1. After task 94, switchable ground communication link 20 has been handed off, and program control loops back to task 60, discussed above.

FIG. 10 shows a flow chart of tasks performed in a background procedure 96 performed by satellite nodes 14 of network 10. Generally speaking, background procedure 96 is an ongoing procedure which, more or less, remains continuously operational in the background compared to other activities being performed at satellite 14. As indicated by ellipsis in FIG. 10, procedure 96 may perform many tasks that are not related to the present invention. However, in a task 98 data packets are received from other nodes 38 of network 10. Any number of data packets may be received. As discussed above, each data packet desirably includes a routing code that satellite 14 evaluates in determining from which of its ports to transmit the data packet. Next, task 100 transmits the data packets by linking the routing codes to satellite transmission ports through a routing table 102, an exemplary block diagram of which is shown in FIG. 11.

Figures 11, 12:
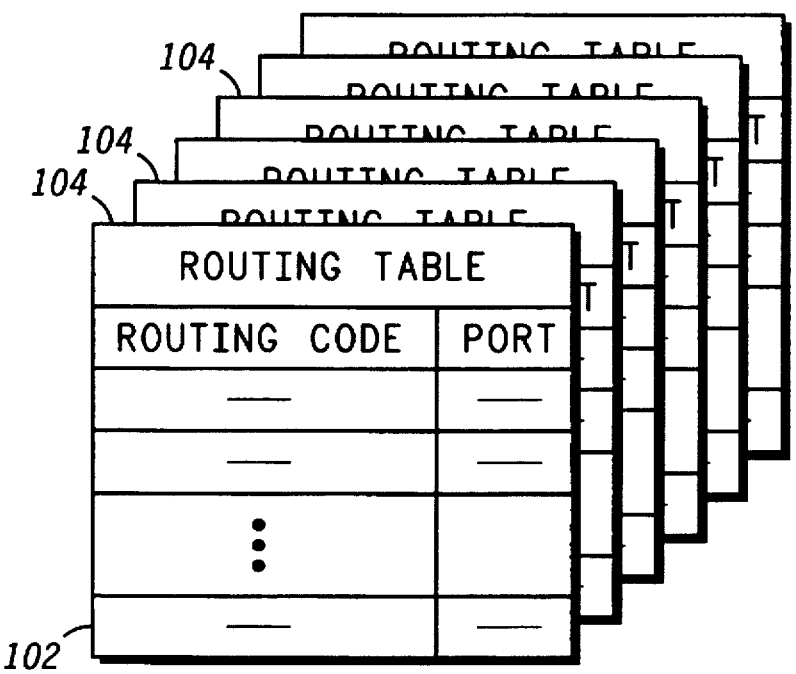
FIG. 11 shows a block diagram of an exemplary routing table memory structure maintained in various satellite nodes of the network.
FIG. 12 shows a block diagram of a satellite ground link directive stored in the memory of satellite nodes.

Referring to FIG. 11, routing table 102 may be viewed as having any number of pages 104, with only one of the pages activated at any given time. The activated page 104 represents the portion of the current routing plan that pertains to the satellite 14. Inactive pages 104 pertain to routing plan data for the satellite 14 in future periods of time. Routing table 102 may include a list of routing codes, each associated with a port designation. Task 100 (see FIG. 10) may, for example, perform a table look-up operation on table 102 using the routing code as an index. However, those skilled in the art can devise other techniques for obtaining a port identity from a routing code. Task 100 then arranges the data packets in transmit buffers 52 (see FIG. 4) and controls port switch 40 (see FIG. 4) so that the data packets are transmitted away from satellite 14 through the specified ports.

Referring back to FIG. 10, background procedure 96 also performs a query task 106. Task 106 determines whether it is currently time for the next event scheduled in the satellite's event queue 64 (see FIG. 7). If the next event needs to be executed, a task 108 performs the directive pertaining to the scheduled time, and a task 110 maintains event queue 64 by arranging pointers to identify the subsequent event.

One of the events which may be scheduled through event queue 64 in satellite 14 is the turning of pages in routing table 102 (see FIG. 11) so that new routing data become activated. In other words, the updating or activating of new routing data may be scheduled through event queue 64. Either an entirely new table 102 may be activated, or an existing table may be modified in accordance with data received from space control segment 26. As discussed above, the normal handoff time T0 for a switchable link 20 somewhere in network 10 may trigger this event. As will be discussed below, this time can be locally modified to indicate exception handoff time T+1 when needed.

Another of the events which may be scheduled through event queue 64 in satellite 14 is a satellite ground link directive 112, an exemplary block diagram of which is shown in FIG. 12. As shown in FIG. 12, directive 112 may include data which identify a particular antenna 34 (see FIG. 2), data which specify a direction to aim the antenna 34 so that it points at a particular gateway 24, and data which specify a particular signal type to apply to the specified antenna.

Directive 112 is desirably scheduled for execution by arriving satellites 14' at time T−3 (see FIG. 3). At this scheduling, the antenna data may specify an antenna 34 that is not then currently in use, the direction data may specify a direction to aim the antenna 34 at the upcoming gateway 24, and the signal type may specify beacon signal 36. Additional directives 112 may be scheduled from time to time so that the aiming of antenna 34 tracks gateway 24 as satellite 14 moves in its orbit from horizon to horizon. Beacon signal 36 may change to a preamble or other acquisition signal when the gateway 24 sends an acknowledgement signal, as discussed above in connection with task 90 (see FIG. 6). Finally, a directive 112 may be scheduled for the normal or exception handoff time T0 or T+1 to change the signal type to data packets.

Referring back to FIG. 10, after task 110, and when task 106 determines than it is not time for the next scheduled event, program control loops back to task 98. Desirably, satellite 14 continuously performs background procedure 96 so that data packets are continuously switched through satellite 14 and so that directives are continuously executed as scheduled.

Figure 13:
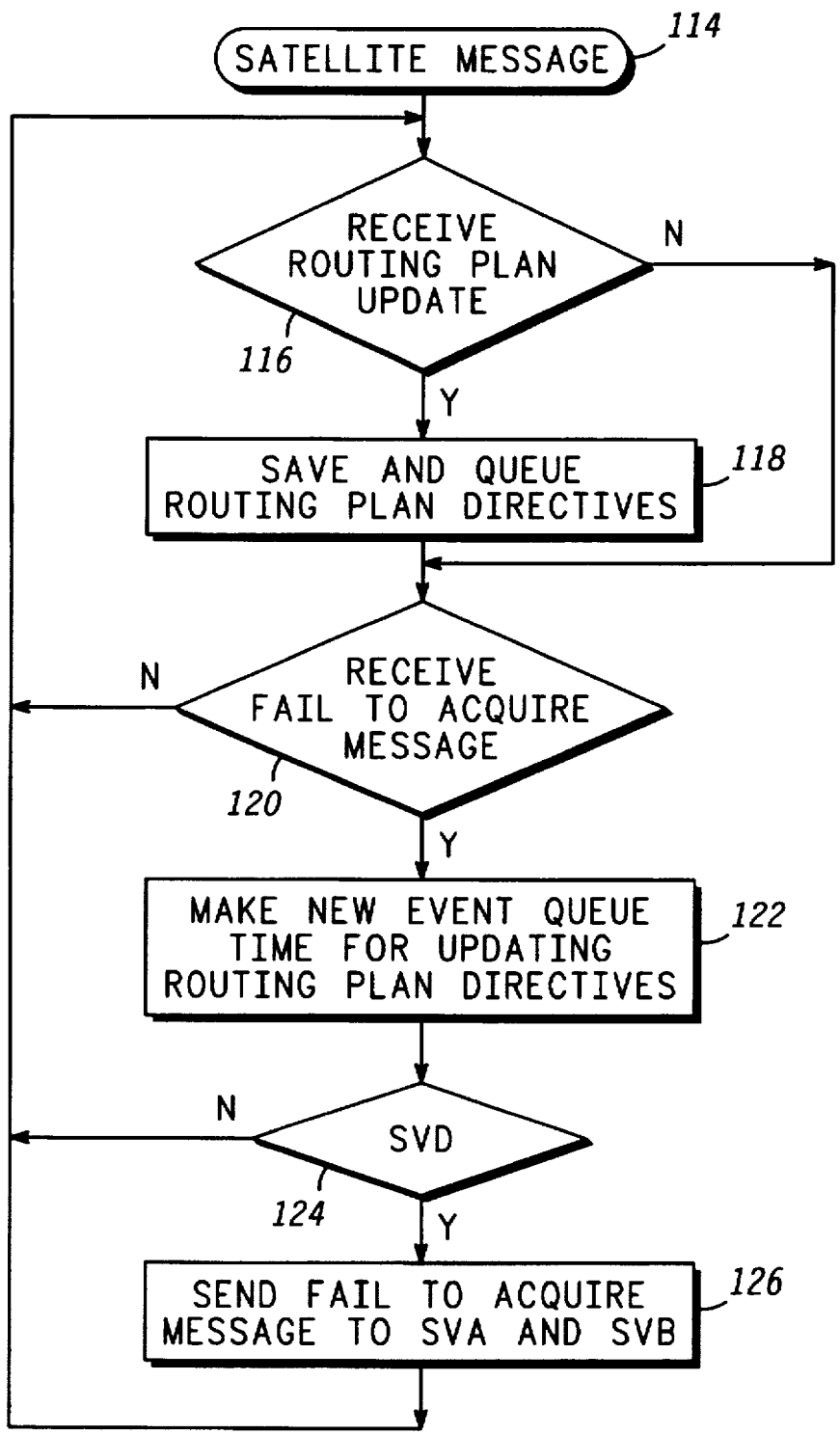
FIG. 13 a flow chart of tasks performed by the satellite nodes to respond to messages received at the satellites.

FIG. 13 shows a flow chart of tasks performed in a satellite message procedure 114 performed by satellite nodes 14 of network 10. Generally speaking, message procedure 114 is performed to handle incoming messages directed to satellite 14, whether a departing satellite 14, an arriving satellite 14', or otherwise. These messages may have originated from space control segment 26, a gateway 24, or a departing satellite 14. As indicated by ellipsis in FIG. 13, procedure 114 may perform many tasks that are not related to the present invention. However, in a query task 116 satellite 14 determines whether a new routing plan or an update to an old routing plan has been received from space control segment 26 (see FIGS. 1 and 5). The routing plan may be received in the form of a message transmitted from space control segment 26 to satellite 14 via network 10. If a routing plan update is received, a task 118 saves the routing plan update data in memory 50 (see FIG. 4) and queues an appropriate directive for activating the new routing plan at the indicated time.

After task 118 saves and queues any newly received routing plan data or when task 116 determines that no new routing plan data has been received, a query task 120 determines whether satellite 14 has received fail to acquire message 80 (see FIG. 9). A departing satellite 14 may receive fail to acquire message 80 from a gateway 24. An arriving satellite 14' or a bridging satellite 14 may receive a fail to acquire message 80 from a departing satellite 14. If a departing satellite 14 receives message 80 from a gateway 24, message 80 may conform to the format shown in FIG. 9 and discussed above in connection with task 78 (see FIG. 6). However, if an arriving satellite 14' or a bridging satellite 14 (see FIG. 1) receives a fail to acquire message 80, data identifying the arriving satellite 14' may be omitted.

When task 120 determines that no fail to acquire message 80 has been received, program control loops back to task 116. When task 120 determines that a fail to acquire message 80 has been received, a task 122 alters its schedule specified in event queue 64 (see FIG. 7) for satellite 14. In particular, task 122 alters the time specified for activating updated routing plan directives. This time was previously specified by space control segment 26 as the normal hand off time T0 (see FIG. 3). Task 122 alters the time to the exception time T+1. The exception time T+1 may be obtained from fail to acquire message 80. The normal handoff time will be ignored as a result of altering the normal handoff time T0 to the exception handoff time T+1.

After task 122, a query task 124 determines whether the satellite 14 performing procedure 114 is a departing satellite (SVD). If it is not a departing satellite 14, it is an arriving satellite 14' or a bridging satellite 14. If not a departing satellite 14, program control loops back to task 116. No other actions need be taken, and the satellite 14 will handoff switchable ground link 20 at the exception time T+1 through the processing of event queue 64 (see FIG. 7).

When task 124 determines that the satellite 14 performing procedure 114 is a departing satellite (SVD), a task 126 sends fail to acquire message 80 on to arriving satellite 14' and any bridging satellites 14 that are needed to deliver message 80 to the arriving satellite 14'. As discussed above, this version of fail to acquire message 80 may omit the identity of arriving satellite 14'. The identity of arriving satellite 14' may be determined from the message 80 (see FIG. 9) received at departing satellite 14. The identity of any bridging satellite 14 may be determined from examining the transmission port of the departing satellite 14 needed to transmit message 80 on to arriving satellite 14'. If this port does not directly service arriving satellite 14', then this port services a bridging satellite 14 that needs to receive message 80 as well. After task 126, program control loops back to task 116.

In summary, the present invention provides an improved communication network. The satellite communication network of the present invention schedules times for handing off communication links between satellites. However, localized exceptions to the scheduled handoff times are permitted when a gateway has trouble acquiring an arriving satellite. The localized exceptions allow a local area of nodes, such as a departing satellite, gateway and arriving satellite, to temporarily continue operating on old routing data while the rest of the network routes data in accordance with new routing data. The network incorporates features to improve the likelihood of a gateway acquiring an arriving satellite signal before handing off communications to a link between the ground station and arriving satellite. Such features include the use of multiple, spaced apart antennas for acquiring an arriving satellite and the ability to operate under a localized exception to routing data scheduling.

The present invention has been described above with reference to preferred embodiments. However, those skilled in the art will recognize that changes and modifications may be made in these preferred embodiments without departing from the scope of the present invention. For example, a gateway may send an "acquired arriving satellite" message which causes the gateway, departing satellite, and arriving satellite to switch to new routing data prior to the exception handoff time T+1 but after the normal handoff time T0. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from network to network. These and other changes and modifications which are obvious to those skilled in the art are intended to be included within the scope of the present invention.

What is claimed is:

1. In a communication network having a plurality of mobile nodes interconnected by constellation communication links and having a stationary node supporting a switchable communication link with one of said mobile nodes, a method for controlling handoff of said switchable link comprising the steps of:

a) forming a schedule that identifies a point in time at which to handoff said switchable link from a departing mobile node to an arriving mobile node;

b) prior to said point in time, determining whether said stationary node can communicate with said arriving mobile node;

c) ignoring said schedule when said step b) determines that said stationary node cannot communicate with said arriving mobile node; and d) sending a message from said stationary node to said departing node over said switchable link when said step (b) determines that said stationary node cannot communicate with said arriving mobile node, said message informing said departing mobile node that said stationary node cannot communicate with said arriving node.

2. A method for controlling handoff as claimed in claim 1 additionally comprising the step of following said schedule when said step b) determines that said stationary node can communicate with said arriving mobile node.

3. A method for controlling handoff as claimed in claim 1 additionally comprising the step of sharing said schedule among said stationary node, said departing mobile node, and said arriving mobile node.

4. A method for controlling handoff as claimed in claim 3 additionally comprising the step of associating an identity for said arriving mobile node with said point in time in said schedule for said stationary node.

5. A method for controlling handoff as claimed in claim 1 wherein said point in time is a normal handoff point, and said method additionally comprises the step of associating an exception handoff point with said normal handoff point, said exception handoff point occurring after said normal handoff point.

6. A method for controlling handoff as claimed in claim 5 additionally comprising the steps of:

operating said switchable link between said stationary node and said departing mobile node prior to said normal handoff point;

operating said switchable link between said stationary node and said departing mobile node after said normal handoff point when said step b) determines that said stationary node cannot communicate with said arriving mobile node; and operating said switchable link between said stationary node and said arriving mobile node after said exception handoff point.

7. A method for controlling handoff as claimed in claim 6 additionally comprising the step of operating said switchable link between said stationary node and said arriving mobile node after said normal handoff point when said step b) determines that said stationary node can communicate with said arriving mobile node.

8. A method for controlling handoff as claimed in claim 1 additionally comprising the steps of:

receiving said message at said departing mobile node; and altering, in response to said receiving step, said schedule to identify an exception point in time, said exception point in time occurring after said point in time.

9. A method for controlling handoff as claimed in claim 1 additionally comprising the steps of:

receiving said message at said departing mobile node; and sending a second message, in response to said receiving step, from said departing mobile node to said arriving mobile node, said second message instructing said arriving mobile node to ignore said schedule.

10. A method for controlling handoff as claimed in claim 1 additionally comprising the steps of:
- transmitting a beacon signal from said arriving mobile node prior to said point in time;
- operating a first antenna associated with said stationary node to search for said beacon signal; and
- operating a second antenna associated with said stationary node to search for said beacon signal.

11. A method for controlling handoff as claimed in claim 10 additionally comprising the step of spacing said first and second antennas at least 1 km apart.

12. A method for controlling handoff as claimed in claim 1 wherein said mobile nodes are satellites orbiting the earth.

13. In a communication network having a plurality of mobile nodes interconnected by constellation communication links and having a stationary node supporting a switchable communication link with one of said mobile nodes, a method for controlling handoff of said switchable link comprising the steps of:
- a) forming a schedule that identifies a point in time at which to handoff said switchable link from a departing mobile node to an arriving mobile node;
- b) prior to said point in time, determining whether said stationary node can communicate with said arriving mobile node;
- c) ignoring said schedule when said step b) determines that said stationary node cannot communicate with said arriving mobile node; and
- d) routing communications among said mobile nodes, except for said departing mobile node, said arriving mobile node, and any bridging node between said departing and arriving mobile nodes, after said point in time the same as if said schedule were not ignored when said step b) determines that said stationary node cannot communicate with said arriving mobile node.

14. In a communication network having a plurality of mobile nodes interconnected by constellation communication links and having a stationary node supporting a switchable communication link with one of said mobile nodes, a method executed by said stationary node for controlling handoff of said switchable link comprising the steps of:
- a) the stationary node forming a schedule that identifies a point in time at which to handoff said switchable link from a departing mobile node to an arriving mobile node;
- b) prior to said point in time, the stationary node determining whether communication can be established with said arriving mobile node;
- c) the stationary node ignoring said schedule when said step b) determines that communication cannot be established with said arriving mobile node; and
- d) the stationary node sending a message to said departing node over said switchable link when said step (b) determines that said stationary node cannot communicate with said arriving mobile node, said message informing said departing mobile node that said stationary node cannot communicate with said arriving node.

* * * * *